(12) United States Patent
Chueh et al.

(10) Patent No.: US 9,083,481 B2
(45) Date of Patent: Jul. 14, 2015

(54) SYSTEM, METHOD AND COMPUTER-READABLE MEDIUM FOR ACTIVELY CANCELLING INTERFERNCE SIGNALS

(75) Inventors: Joseph Chueh, NSW (AU); Bin Guo, NSW (AU); Yonghui Li, NSW (AU); Branka Vucetic, NSW (AU)

(73) Assignee: Joseph Chueh, NSW (AT)

( * ) Notice: Subject to any disclaimer, the term of this patent is extended or adjusted under 35 U.S.C. 154(b) by 539 days.

(21) Appl. No.: 12/542,017

(22) Filed: Aug. 17, 2009

(65) Prior Publication Data

US 2011/0039496 A1    Feb. 17, 2011

(51) Int. Cl.
*H04B 1/00*       (2006.01)
*H04J 11/00*      (2006.01)
*H04B 17/345*     (2015.01)

(52) U.S. Cl.
CPC .......... *H04J 11/0036* (2013.01); *H04B 17/345* (2015.01)

(58) Field of Classification Search
CPC ........................... H04B 17/345; H04J 11/0036

USPC ......................................................... 455/63.1
See application file for complete search history.

(56) References Cited

U.S. PATENT DOCUMENTS

| | | | |
|---|---|---|---|
| 6,745,003 B1 * | 6/2004 | Maca et al. .................. | 455/11.1 |
| 8,135,349 B2 | 3/2012 | Hwang et al. | |
| 2008/0070510 A1 * | 3/2008 | Doppler et al. ................. | 455/69 |
| 2009/0231989 A1 * | 9/2009 | Larsson et al. ................ | 370/201 |

\* cited by examiner

*Primary Examiner* — David Bilodeau
(74) *Attorney, Agent, or Firm* — WPAT, PC; Justin King (57) ABSTRACT

This invention discloses a system, method and computer-readable medium for actively cancelling interference signals. The system mentioned above communicates with at least one first transceiver. The abovementioned system includes at least one second transceiver, and a relay base station receiving a feedback signal from the at least one second transceiver and an environmental signal to execute a signal correlation function to get a result and determining to generate an anti-interference signal depending on the result. Herein, the relay base station cancels interference signals around the at least one first transceiver by sending the anti-interference signal to the at least one first transceiver via at least one third transceiver having an optimal communication channel to the at least one first transceiver.

14 Claims, 7 Drawing Sheets

SYSTEM, METHOD AND COMPUTER-READABLE MEDIUM FOR ACTIVELY CANCELLING INTERFERNCE SIGNALS

BACKGROUND OF THE INVENTION

1. Field of the Invention

This invention generally relates to the field of communication, and more particularly, to a system, method and computer-readable medium for actively cancelling interference signals in communication.

2. Description of the Prior Art

As a result of wireless communication being developed fast and becoming more popular, the interference in wireless communication systems is serious factor to decide system performance and efficiency. Therefore, how to cancel the interference in wireless systems turns out to be a development issue for the wireless communication equipment suppliers, carriers and the transceiver manufacturers.

Once, the wireless communication bandwidth was divided into several individual frequency channels for service vendors to dilute the problem of the system interference. With limited spectrum and fast growing demand for wireless communications, the wireless communication system, however, is sharing frequency channels for more service vendors. That is, one frequency channel has at least one communication system and each communication system modulates its own signal in different way to conduct communication process. Accordingly, the interference in the wireless communication channel is hard to avoid. The interference not only affects the radio coverage and system capacity but also reduces the transmission efficiency.

Figure 1A:
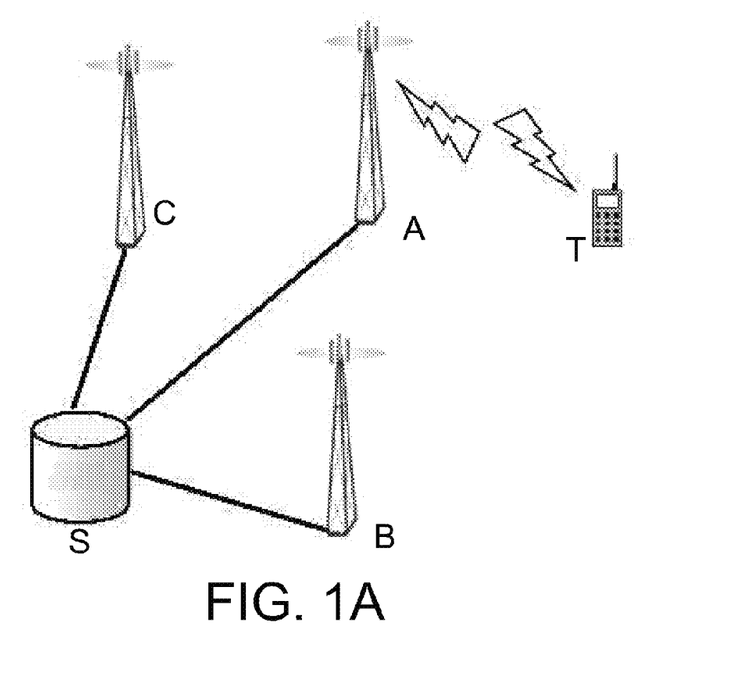
FIG. 1A shows a diagram of a transceiver T communicating in a wireless communication.
Figure 1B:
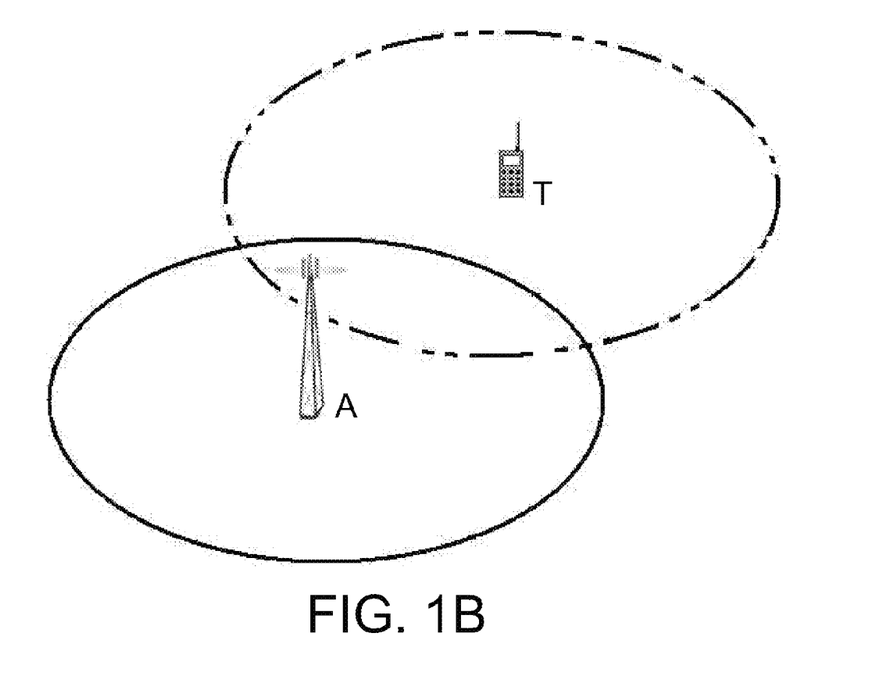
FIG. 1B illustrates a diagram of the transmission coverage between a transceiver T and a base station A.

Referring to FIG. 1A, a transceiver T communicates in a wireless communication is illustrated. Base stations (or antenna sets) A, B, and C and a system S are distributed to form a network structure. The system S connects the base stations A, B, and C by wiring. The transceiver T communicates with the base station A via wireless transmission and there is no interference signal in the environment. Referring to FIG. 1B, the transmission coverage between a transceiver T and a base station A is depicted. The base station A serves wireless communication within a circle with solid line area, and the radio range of the transceiver T shows a circle with dot and line area. The intersection zone between the circle with solid line and the circle with dot and line is the communication area for the base station A to communicate with the transceiver T.

Figure 1C:
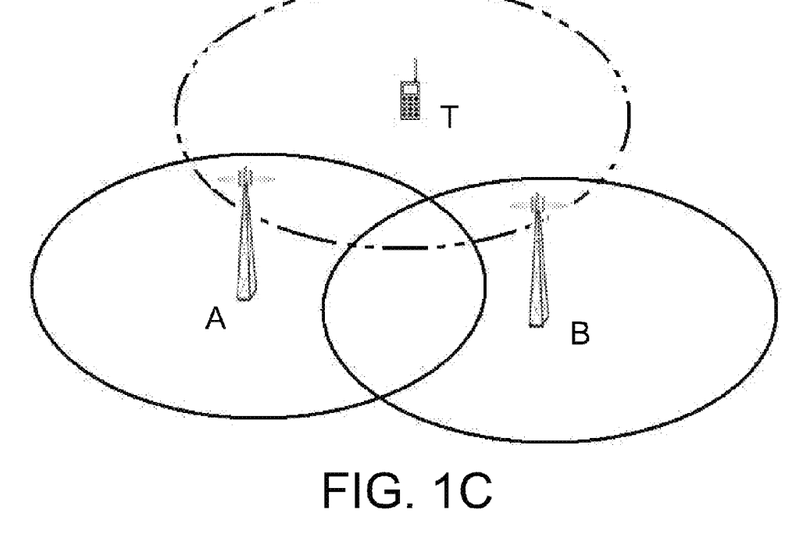
FIG. 1C illustrates a diagram of the communication between a transceiver T and a base station A affected by a base station B with the same communication system.
Figure 1D:
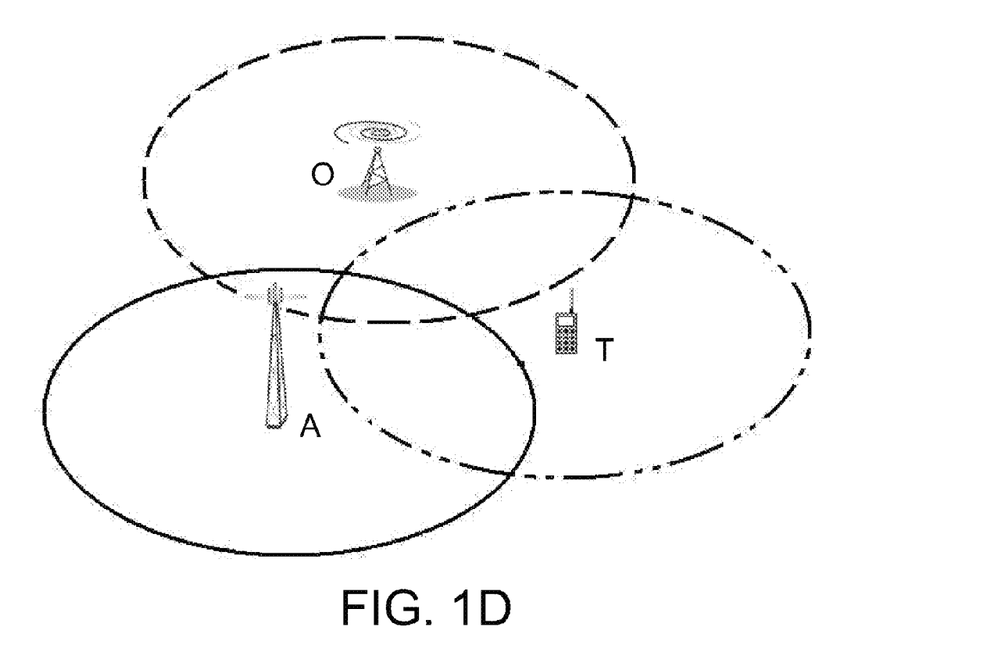
FIG. 1D illustrates a diagram of the communication between a transceiver T and a base station A affected by a base station O with the different communication system.

Referring to FIG. 1C, the communication between a transceiver T and a base station A affected by a base station B with the same communication system is shown. The transceiver T only communicates with the base station A through wireless communication, but the service area of the base station B with the same communication system overlaps the communication range between the transceiver T and the base station A. This leads to the transceiver T interfered by signals of the base station B, and such interference is called intra interference. Referring to FIG. 1D, the communication between a transceiver T and a base station A affected by a base station O with the different communication system is shown. The transceiver T only communicates with the base station A via wireless communication, but the service area of the base station O with the different communication system overlaps the communication range between the transceiver T and the base station A. This causes the transceiver T interfered by signals of the base station O, and such interference is called outer interference.

Figure 1E:
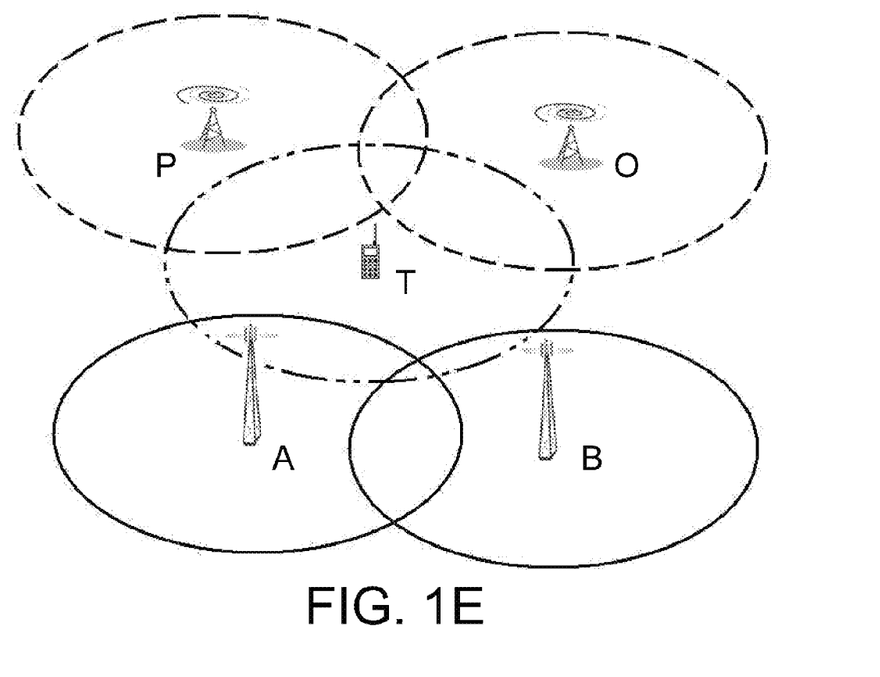
FIG. 1E illustrates a diagram of the communication between a transceiver T and a base station A affected by a base station B with the same communication system and base stations O and P with the different communication system.

Referring to FIG. 1E, the communication between a transceiver T and a base station A affected by a base station B with the same communication system and base stations O and P with the different communication system is shown. The transceiver T only communicates with the base station A via wireless communication, although there are base stations B, O, and P in the same environment. Herein, the base station B has the same system to the base station A but the base stations O and P are different system from the base station A. FIG. 1E depicts a simple interference condition. That is, the communication between the transceiver T and the base station A is only affected by the interference signal of the base station B. The signals of the base stations O and P only affect the sending and receiving range of the transceiver T, but no affecting the communication between the transceiver T and the base station A.

Figure 1F:
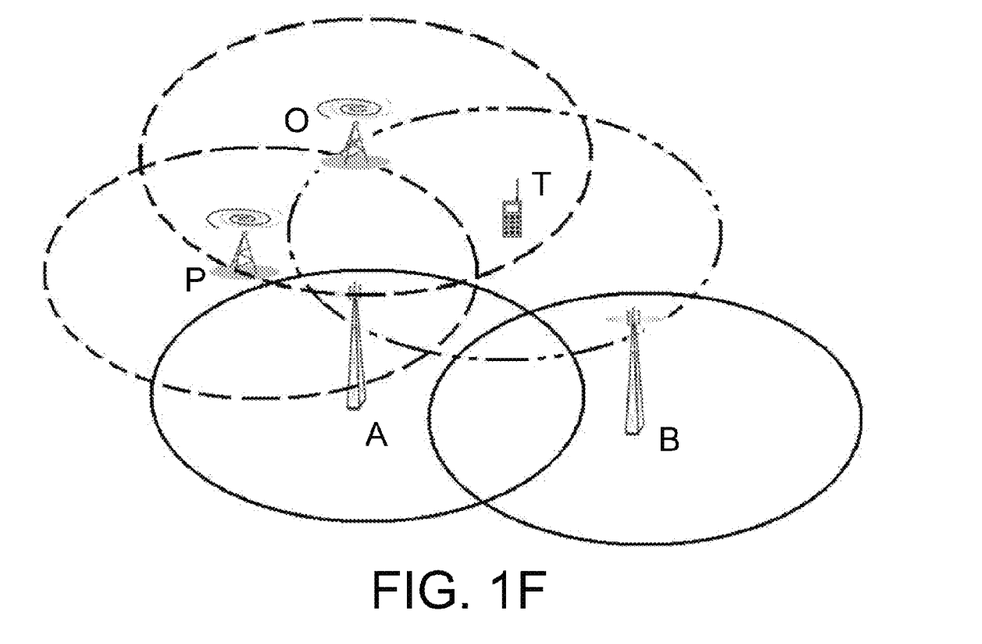
FIG. 1F illustrates another diagram of the communication between a transceiver T and a base station A affected by a base station B with the same communication system and base stations O and P with the different communication system.

Referring to FIG. 1F, the communication between a transceiver T and a base station A affected by a base station B with the same communication system and base stations O and P with the different communication system is shown. The transceiver T only communicates with the base station A via wireless communication, and there are other base stations B, O, and P existing in the same environment. Herein, the base station B is the same system to the base station A but the base stations O and P are different system from the base station A. As shown in FIG. 1F, there is interference between the communication of the transceiver T and the base station A. The interference includes the signals from the same system's base station B, and from the different system's base stations O and P.

With an extremely complex wireless communication environment, most of the wireless device vendors equip smart filters and decoders on their transceiver which filters and decodes its own signal from the physical channel. Yet the development of the transceivers trend to small and light and the communication circuit design is becoming more complex as well. Thus a revolution technology to mitigate and cancel interference in wireless communications is an essential development.

Recently, various schemes have been studied to suppress co-channel interference in co-working wireless networks. In M. H. M. Costa, "Writing on dirty paper", IEEE Trans. Inf. Theory, vol. 49, no. 3. pp. 439-441, 1983., a frequency domain iterative multi-user detector for co-channel interference suppression in downlink of wireless cellular system was proposed. A zero forcing (ZF) scheme, which optimizes transmit and receive beamforming for multiuser MIMO to cancel the interference was considered in A. M. A. Ahmed, I. Marsland, "Co-channel interference cancellation in wireless cellular networks", IEEE Vehicular Technology Conference, 2008. This work has been extended by combining with "dirty-paper" coding in Q. H. Spencer, A. L. Swindlehurst, and M. Haardt, "Zero-forcing methods for downlink spatial multiplexing in multiuser MIMO channels," IEEE Tran. Signal Process, vol. 52, no. 2, pp. 461-471, 2004. The high complexity of dirty paper coding has made such a scheme difficult to be implemented in practical system. Furthermore, the algorithms require full channel state information (CSI) of all users at the transmitter, while each user only knows its own CSI in reality G. J. Foschini, K. Karakayali, and R. A. Valenzuela, "Coordinating multiple antenna cellular networks to achieve enormous spectral efficiency", IEEE Proc. on Communications, vol. 153, no. 4, pp. 548-555, 2006. In IEEE Std 802.11., 2003 Edition, Std., a cooperative precoding and beamforming algorithm was proposed, which combines Tomlinson-Harashima precoding with transmit-receive beamforming based on W. Hardjawana, B. Vucetic, and Yonghui Li, "Cooperative Precoding and Beamforming in Co-working WLANs", ICC'08 IEEE International Conference 2008, pp. 4759-4763. However, the drawbacks of all these schemes mentioned above are not only the complexity, but also some practical issues. One issue is that in all these schemes, the existing transmitter structure of base stations (BSs) and receiver structure of the mobile stations (MSs) have to be changed. This means that the manufactures have to redevelop the transceivers. This will increase the cost of system implementation and deployments. Nevertheless, such technology also incurs more energy consumption and it is not eco-friendly in the 21st century.

In view of the drawbacks mentioned with the prior art, there is a continuous need to develop a new and improved system, method and computer-readable medium that overcomes the disadvantages and shortages which are associated with the prior art. The advantages of the present invention are that it solves the problems mentioned above with more efficiency technology for wireless communication in the 21st century.

SUMMARY OF THE INVENTION

In accordance with the present invention, a system, method and computer-readable medium for actively cancelling interference signals substantially obviates one or more of the problems resulted from the limitations and disadvantages of the prior art mentioned in the background.

The present invention provides a system for actively cancelling interference signals. The system communicates with at least one first transceiver. The system includes at least one second transceiver, and a relay base station which receives a feedback signal from the at least one second transceiver and an environmental signal to execute a signal correlation function to get a result. The relay base station also determines to generate an anti-interference signal depending on the result. Herein, the relay base station cancels interference signals around the at least one first transceiver by sending the anti-interference signal to the at least one first transceiver via at least one third transceiver which has an optimal communication channel away from the at least one first transceiver.

The present invention also discloses a method for actively cancelling interference signals of at least one first transceiver in a communication system. The method includes (a) receiving a feedback signal from at least one second transceiver and detecting an environmental signal by a relay base station; (b) correlating the feedback signal and the environmental signal to get a result by the relay base station; (c) determining to generate an anti-interference signal by the relay base station depending on the result; and (d) cancelling interference signals around the at least one first transceiver by the relay base station in sending the anti-interference signal to the at least one first transceiver via at least one third transceiver. Herein, the at least one third transceiver has an optimal communication channel away from the at least one first transceiver.

The present invention further reveals a computer-readable medium encoded with computer program code for actively cancelling interference signals of at least one first transceiver in a communication system. The program code causes a computer to execute a method including the steps of (a) receiving a feedback signal from at least one second transceiver and detecting an environmental signal; (b) correlating the feedback signal and the environmental signal to get a result; (c) determining to generate an anti-interference signal depending on the result; and (d) cancelling interference signals around the at least one first transceiver by sending the anti-interference signal to the at least one first transceiver via at least one third transceiver. Herein, the at least one third transceiver has an optimal communication channel away from the at least one first transceiver.

The present invention still provides a system for actively cancelling interference signals. The system communicates with at least one first transceiver. The system includes a communication network linking with the at least one first transceiver, and a relay base station receiving a feedback signal and an environmental signal from the communication network to execute a signal correlation function to get a result. The relay base station also determines to generate an anti-interference signal depending on the result. Herein, the relay base station cancels interference signals around the at least one first transceiver by sending the anti-interference signal to the at least one first transceiver via the communication network.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Some embodiments of the present invention will now be described in greater detail. Nevertheless, it should be noted that the present invention can be practiced in a wide range of other embodiments besides those explicitly described, and the scope of the present invention is expressly not limited except as specified in the accompanying claims.

Moreover, some irrelevant details are not drawn in order to make the illustrations concise and to provide a clear description for easily understanding the present invention.

The present invention provides a system for active interference cancellation in communication. The system mentioned above includes a network structure, a relay base station (RBS, thereinafter called "RBS"), and at least one first transceiver and at least one second transceiver. The network structure has a plurality of base stations (or antenna sets) which are distributed to form a communication network with the RBS. The first transceiver transmits signals to the RBS via the network structure, wherein the signals have varied interference signals. The RBS executes a mathematic correlation of the signals to get a result for determining to generate an anti-interference signal. The RBS calculates the relative location from the second transceiver to the RBS. The RBS sends the anti-interference signal to the first transceiver via the second transceiver, wherein the second transceiver has an optimal communication channel to the first transceiver. The present invention is physically equivalent to use two signals having the same waveform but 180 degree phase difference to cancel each other.

The present invention also provides a method for active interference cancellation to cancel the interference of at least one first transceiver in a communication system. The method mentioned above includes: receiving a feedback signal and detecting an environmental signal from a network structure by an RBS; correlating the feedback signal and the environmental signal by the RBS to get a result; determining to generate an anti-interference signal depending on the result; and cancelling the interference around the first transceiver by the RBS in sending the anti-interference signal to the first transceiver via a second transceiver. Herein, the network structure has a plurality of base stations (or antenna sets) distributed to form a communication network with the RBS, and the second transceiver has an optimal communication channel to the first transceiver.

According to the background of the invention, designing electric circuits within a transceiver would be difficult. Thus, the present invention provides an active anti-interference communication system and method, directly uses the communication system to cancel the interference in the environment. The abovementioned network structure is constructed by signal communicating among a plurality of base stations with the RBS and the main tasks thereof includes signal receiving, communication connecting, and sending an anti-interference signal. The abovementioned RBS receives the signals transmitted from the network structure, and processes them to be calculated in a mathematics process, and the main tasks thereof includes calculating the signals in correlation function, generating an anti-interference signal and searching a base station with an optimal communication channel to the first transceiver. The abovementioned first transceiver includes a tool, such as mobile phone, PDA, laptop, and etc., for a user to send/receive signals to/from one of the base stations in the network structure to build up a communication link and to communicate with the RBS, and the main tasks thereof include communication linking and the anti-interference signal receiving. Wherein, the interference mentioned above includes the channel information, other transmitting data, and so on.

Figure 2:
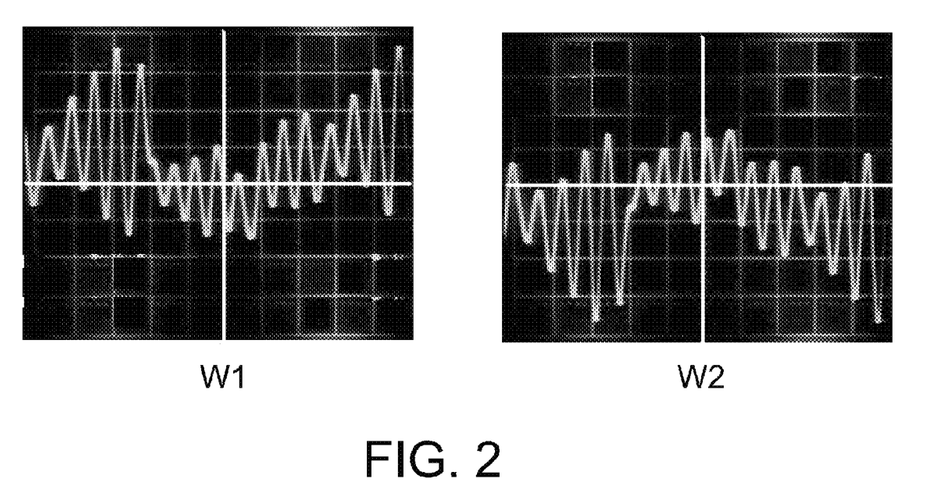
FIG. 2 illustrates two signal waveforms with 180 degree difference in phase, one signal waveform W1 shows an original signal waveform and the other signal waveform W2 shows the inverted signal waveform of the signal waveform W1.

One of the main technical ideals of the present invention is that acquiring an interference signal from an environment, such as the waveform W1 shown in FIG. 2, then inverting it to 180 degree in phase, such as the waveform W2 shown in FIG. 2, and finally sending it back. The reason for mathematically computing weighting signal is to enable an anti-interference signal and to eliminate the interference signal at the first transceiver side. The anti-interference signal is physically equivalent to inverting the interference signal in phase by 180 degree. As the result, the interference signal would be cancelled and the first transceiver side would receive an interference free signal. This is in principle to generate the anti-interference signal. Using the same technical ideal could cancel all kinds of interference signals in the environment. In other words, the first step is to collect and analysis all interference signals to calculate a weighting interference signal and the next step is to generate an anti-interference signal to send back to the environment to cancel the most of interference signals. It is a theory by utilizing two signals with the same waveform but 180 degree difference in phase to eliminate each other. Furthermore, the theory can be applied on cancelling the interference at the first transceiver in the communication system.

The RBS mentioned above is the central computing element while it has knowledge of real time conditions of other communication systems through the network structure. The RBS is the control element which receives the feedback signal and detects the environmental signal via the network structure, and then the RBS is able to compute the anti-interference based on various types of interference signals, such as intra-cell or inter-cell interference. Herein, inter-cell interference which defines interference arriving from other communication systems and intra-cell interference which defines interference arriving from same communication systems. However, to the prospective of the RBS, all interference is treated the same as long as their systems are all connected to the network structure. In other words, the RBS, which is the signal computing element of the active interference cancellation system, bases on a correlation function algorithm to calculate for the anti-interference signal. When the RBS receives the feedback signal and the environmental signal from the network structure, it calculates them and generates a result by a correlation function for an analysis of the interference. Herein, the signals calculated in the correlation function could be the intra-cell interference signals or the inter-cell interference signals or both of them.

The purpose of the correlation function is to output a result for determining whether to generate an anti-interference signal. The result is correlativity between the feedback and the environmental signals via the correlation function and shows the first transceiver is affected on a major interference signal. Thus the RBS works according to the result of the correlation function to invert the interference signal, actually the sum of the interference signals, to 180 degree in phase to generates the anti-interference signal to send through the network structure. The network structure depends on the RBS by an algorithm to search one of the base stations which has an optimal communication channel to the first transceiver to make the anti-interference signal in force cancel the interference around the first transceiver. After the RBS finds the base station with the optimal communication channel away from the first transceiver, the RBS transmits a location data and the anti-interference signal to the base station to make the base station send a directional anti-interference signal. Herein the location data indicates where the first transceiver is, and if the base station has no the location data, the anti-interference signal would be sent in global direction that becomes the interference to other systems. Thus, the location data guides the base station to send the anti-interference signal into a direction to cancel the interference around the first transceiver.

Figure 3:
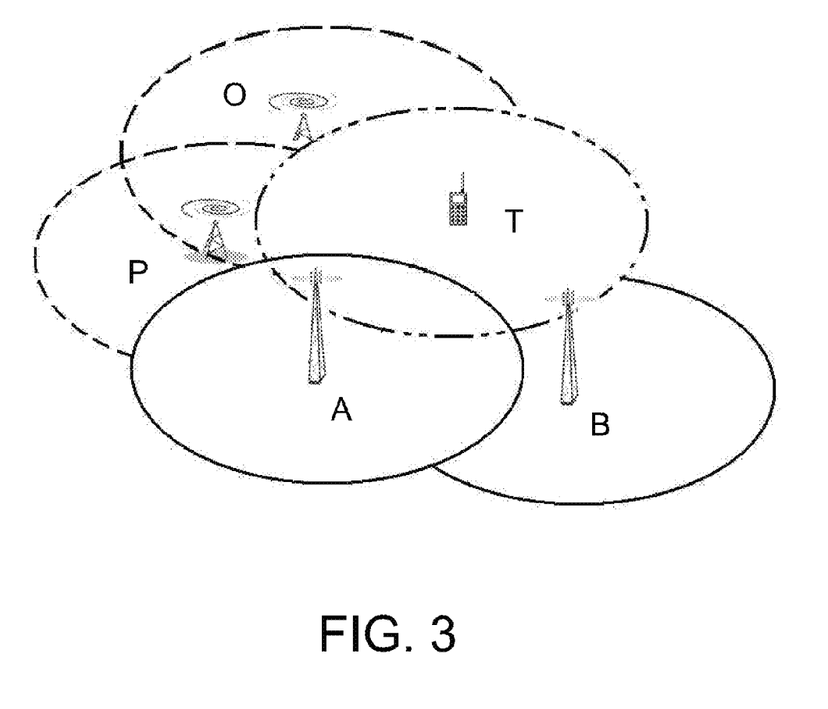
FIG. 3 illustrates an interference cancellation diagram of the communication between a transceiver T and a base station A affected by a base station B with the same communication system and base stations O and P with the different communication system.

Referring to FIG. 3, an interference cancellation diagram of the communication between a transceiver T and a base station A affected by a base station B with the same communication system and base stations O and P with the different communication system is depicted. In such interference condition, an RBS (not shown) takes both intra-cell (referring to intra) interference signal from base station B and inter-cell (referring to outer) interference signal from base stations O and P into a correlation function to acquire a major interference signal between the transceiver T and the base station A for generating an anti-interference signal, and finally combines the anti-interference signal and a location data to be sent by the base station A with a directional antenna to the transceiver T to cancel the interference. By doing so, the interference between the transceiver T and the base station A is cancelled. Particular in the communication range between the transceiver T and the base station A, the interference is eliminated whatever the interference comes from the same system's base station B or the different system's base stations O and P. Finally, the communication range between the transceiver T and the base station A has no any interference and is pure as it shown in FIG. 1B.

Figure 4:
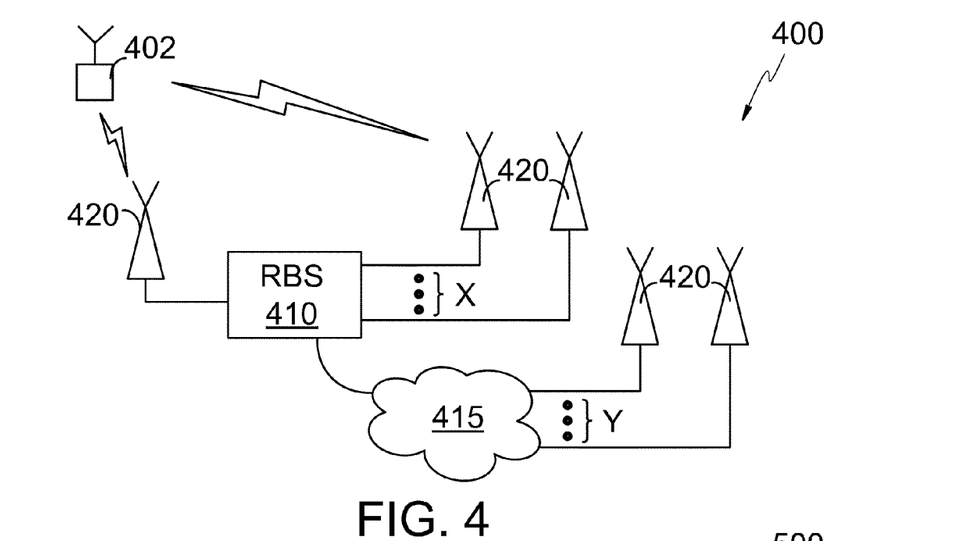
FIG. 4 illustrates a schematic diagram of one preferred active interference cancellation system in accordance with the present invention.

Referring to FIG. 4, a schematic preferred active interference cancellation system 400 in accordance with the present invention is depicted. For the purpose of clear and simple, only one first transceiver 402 is illustrated to explain the present embodiment. The system 400 communicates with at least one first transceiver 402 and includes at least one second transceiver 420 and a relay base station 410 (RBS, thereinafter called "RBS"). The RBS 410 receives a feedback signal from the at least one second transceiver 420 and an environmental signal from other second transceivers 420 to execute a signal correlation function to get a result. The RBS 410 also determines to generate an anti-interference signal depending on the result. And the RBS 410 cancels the interference signals around the at least one first transceiver 402 by sending the anti-interference signal to the at least one first transceiver 402 via at least one third transceiver. Herein the at least one third transceiver is one of the second transceivers 420 which has an optimal communication channel to the at least one first transceiver 402. So the at least one third transceiver could be the at least one second transceiver 420 in some cases. In the present embodiment, the at least one first transceiver 402 could be a fixed device or a mobile device, such as mobile phone, PDA, laptop, desktop, etc. The second transceiver 420 could be mobile base stations or fixed base stations as well. The links between the RBS 410 and the second transceivers 420 could be by wiring or by wireless, and are able to be extended by linking with X second transceivers 420, and Y second transceivers 420 via another network 415, where X, Y are respectively bigger than or equal to 1, and X, Y are the natural numbers.

In addition, the RBS 410 generates the anti-interference signal when the result of the signal correlation function is more than or equal to a predetermined threshold, and the anti-interference signal is equivalent to 180 degree phase inverted signal of the sum of the interference signals. Moreover, the RBS 410 further sends a position data and the anti-interference signal to the at least one third transceiver to guide the anti-interference signal to the at least one first transceiver 402. That is, the at least one third transceiver should have a directional antenna. In the present embodiment, the position data is generated by the RBS 410, indicating where the at least one first transceiver 402 is, and guides the at least one third transceiver to send the anti-interference signal into a direction to cancel the interference signals around the at least one first transceiver 402. Besides, the power of the RBS 410 should be bigger than a specific value depending on the power of the at least one second transceiver 420.

From another aspect, referring to FIG. 4 again, the system 400 communicates with at least one first transceiver 402 and includes a communication network and an RBS 410. The communication network consists of a plurality of second transceivers 420 and links with the at least one first transceiver 402 and the RBS 410. The RBS 410 receives a feedback signal and an environmental signal from the communication network to execute a signal correlation function to get a result, and determines to generate an anti-interference signal depending on the result. And the RBS 410 cancels interference signals around the at least one first transceiver 402 by sending the anti-interference signal to the at least one first transceiver 402 via the communication network. Herein, the RBS 410 generates the anti-interference signal that is equivalent to 180 degree phase inverted signal of the sum of interference signals as the result is more than or equal to a predetermined threshold. In the present embodiment, the RBS 410 receives the feedback signal from one of the plurality of second transceivers 420 which links with the at least one first transceiver 402, and receives the environmental signal from the others of the plurality of second transceivers 420. The RBS 410 further sends a position data with the anti-interference signal to at least one of the plurality of second transceivers 420 which has an optimal communication channel away from the at least one first transceiver 402 to guide the anti-interference signal to the at least one first transceiver 402. That is to say, the at least one of the plurality of second transceivers 420 should have a directional antenna.

Figure 5:
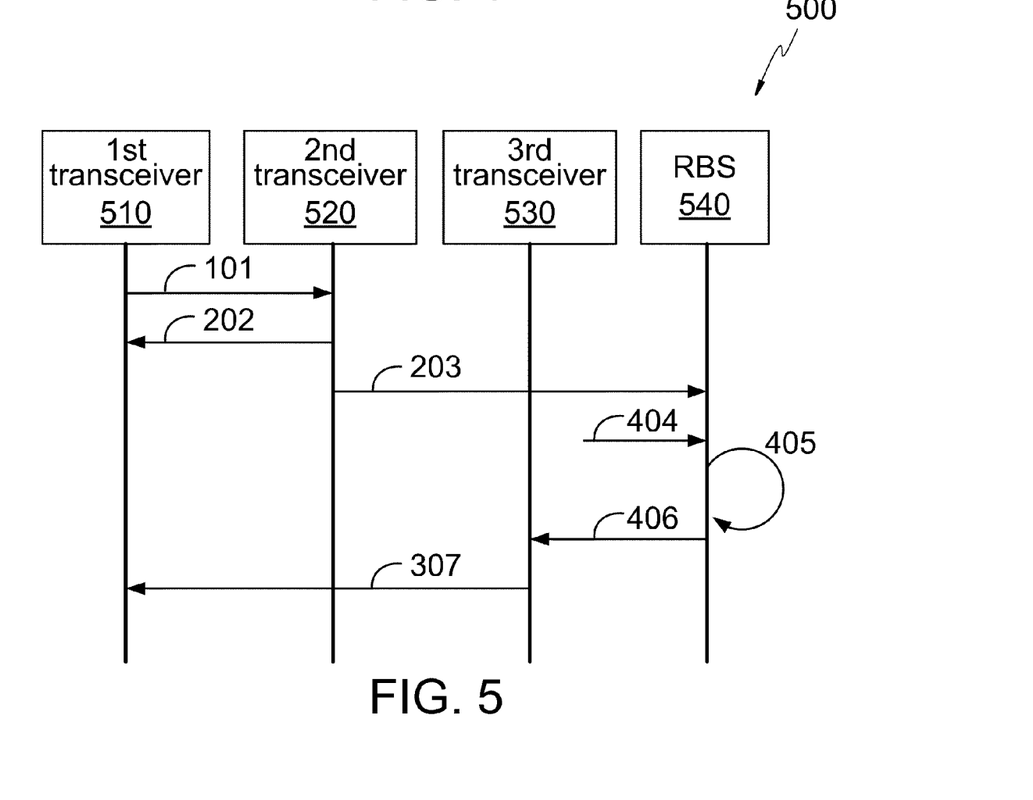
FIG. 5 illustrates a function block diagram for one preferred system in accordance with the present invention, and one preferred flow chart thereof.

Referring to FIG. 5, a function block diagram for one preferred system 500 in accordance with the present invention, and one preferred flow chart thereof are depicted. The method for actively cancelling interference signals of at least one first transceiver in a communication system includes the steps as followings. In step 101, the at least one first transceiver 510 asks at least one second transceiver 520 to build up a communication link, and then the at least one second transceiver 520 responses to the at least one first transceiver 510 that it is waiting for communication receiving in step 202. In step 203, an RBS 540 receives a feedback signal from the at least one second transceiver 520 and detects an environmental signal from other second transceiver (not shown) in step 404. In step 405, the RBS 540 correlates the feedback signal and the environmental signal to get a result and determines to generate an anti-interference signal depending on the result. The RBS cancels the interference signals around the at least one first transceiver 510 by sending the anti-interference signal to the at least one first transceiver 510 via at least one third transceiver 530. That is, in step 406, the RBS 540 sends the anti-interference signal to at least one third transceiver 530, and the at least one third transceiver 530 sends the anti-interference signal to the at least one first transceiver 510 in step 307 to cancel the interference signals. Herein the at least one third transceiver 530 is one of the second transceivers 520 which has an optimal communication channel to the at least one first transceiver 510. So the at least one third transceiver 530 could be the at least one second transceiver 520 in some cases.

Moreover, in the step 405, the RBS 540 generates the anti-interference signal when the result is more than or equal to a predetermined threshold, and the anti-interference signal is equivalent to 180 degree phase inverted signal of the sum of the interference signals. In the step 406, the RBS 540 sends a position data with the anti-interference signal to the at least one third transceiver 530 to guide the anti-interference signal to the at least one first transceiver 510 in step 307. Namely, the at least one third transceiver 530 should have a directional antenna. In the present embodiment, the position data is generated by the RBS 540 to indicate where the at least one first transceiver 510 is, and guides the at least one third transceiver 530 to send the anti-interference signal into a direction to cancel the interference signals around the at least one first transceiver 510. And in the step 406, the RBS further searches the at least one third transceiver 530 which has an optimal communication channel away from the at least one first transceiver 510. Besides, the power of the RBS 540 should be bigger than a specific value depending on the power of the at least one second transceiver 520.

As mentioned above, the present invention further discloses a computer-readable medium encoded with computer program code for actively cancelling interference signals of at least one first transceiver in a communication system. The program code causes a computer to execute a method including the aforementioned steps 203, 404, 405, 406 and 307 shown in FIG. 5. For example, the receiving and detecting procedure (steps 203 and 404), the correlating procedure (step 405), the determining procedure (step 405), the searching procedure (step 406), and the cancelling procedure (steps 406 and 307). Whereby, the program code encoded within the computer-readable medium causes the computer to execute a method for actively cancelling interference signals of at least one first transceiver in a communication system.

In another preferred embodiment in accordance with the present invention, each base station (BS) communicates with its corresponding transceiver (TS) simultaneously, simply transmitting its own signals, and does not need to consider cancelling the interference coming from other BSs. All the interference among all co-working BSs is eliminated by a relay base station (RBS). It can be proved that in order for the RBS to completely remove the interference among all BSs, the RBS must have at least N transmit antennas.

Let $X=[x_1 \Lambda\ x_n]^T$ represents the symbols transmitted from all BSs, where $x_i$ is the symbol transmitted from ith BS. The received signal $y_i$ at ith TS can be expressed as $$y_i = \sqrt{P_1}\left(h_i x_i + \sum_{j=1}^{n, j\neq i} h_{ji} x_j\right) + H_1 W x_i + n_i, \quad (1)$$

where $h_i$ represents the channel coefficient from the ith BS to the ith TS, $h_{ji}$ is the channel of the jth BS to the ith TS. $H_1=\{h_{ri}, i=1,2\Lambda\ N\}$ is a N×N matrix and expresses the channel matrix from the RBS to each TS, where $h_{ri}$ represents the channel coefficients from the RBS to the ith TS. W is the transmit weighting vector of RBS. $n_i$ is the white Gaussian noise at ith TS.

Considering the received signals of all TSs, we can further write the above equation in a matrix form as follows:

$$Y=(H_1 W + \sqrt{P_1} H_2)X + N, \quad (2)$$

where $Y=[y_1 \Lambda\ y_n]^T$ represents the received signal of all TSs. $H_2=\{h_{ji}, i,j=1,2,\Lambda\ N\}$ and $N=[n_1 \Lambda\ n_n]$.

We can observe from Eq. (1) that only the first part is the desired signal for ith TS. The second and third items in Eq. (1) are the interference coming from other non-desired TSs and signal from RBS respectively. These non-desired interfering signals can be eliminated to a certain degree by properly designing the transmitting weighting matrix W. Additionally, it is also desire in practical systems that all TSs have the same BER performance.

Taking above two objectives into account, the optimization problem can be formulated to design W so that Y has the following format, $$Y=KIX+N. \quad (3)$$

Where $Y=[y_1 \Lambda\ y_n]^T$, and $X=[x_1 \Lambda\ x_n]^T$; I is an identity matrix and K is a coefficient. By comparing Eq. (2) with (3), W can be calculated as follows $$W=H^+(KI-\sqrt{P_1}H_2) \quad (4)$$

K can be calculated by using the maximum transmission power constraint of the RBS technology based on mathematical correlation.

Figure 6:
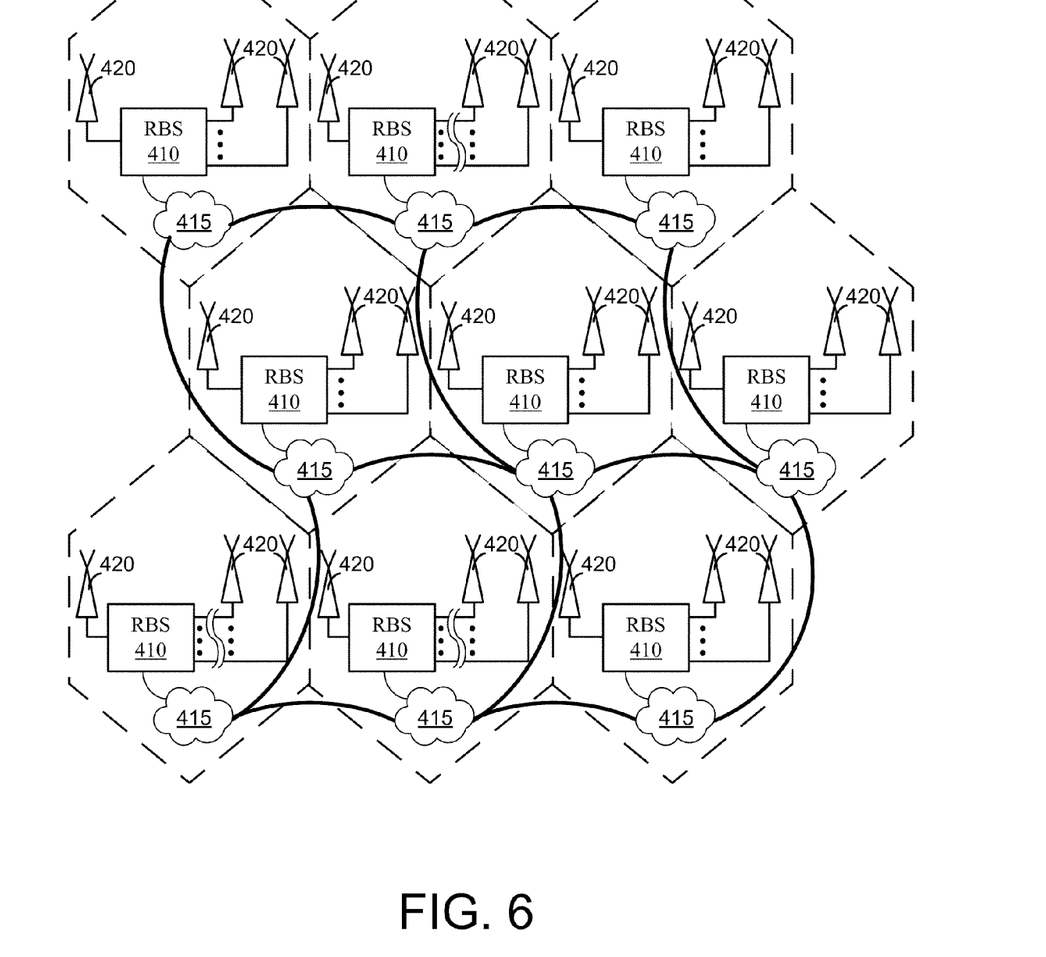
FIG. 6 depicts a preferred application in accordance with the present invention.
Figure 7:
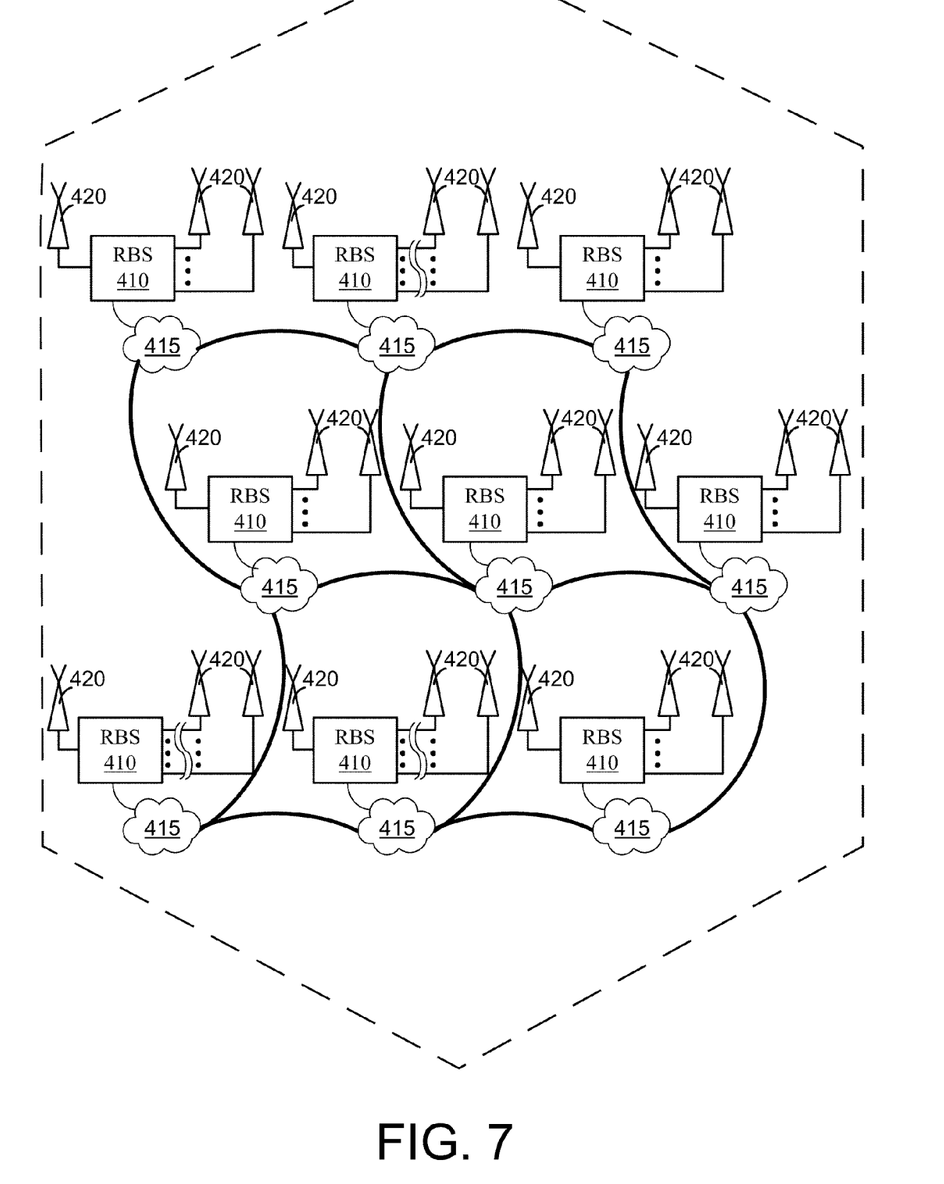
FIG. 7 depicts another preferred application in accordance with the present invention.

Referring to FIGS. 6 and 7, two preferred applications in accordance with the present invention are respectively depicted. In FIG. 6, a plurality of RBSs with a plurality of second transceivers 420 (or base stations) are distributed and connected by a plurality of networks 415 to form a cellular communication system. Each cellular communication area has at least one RBS 410 with at least one second transceiver 420, and the RBS 410 links to the cellular communication system through a network 415, which connects to other networks 415 in different cellular communication areas. When a first transceiver (not shown), such as a mobile phone, a laptop, and etc., communicates in the cellular communication system, the data related to the first transceiver, such as channel information, location, and so forth, is identified by all RBSs 410 in the cellular communication system, since the data is transmitted to all RBSs 410 by the linked second transceiver 420, the linked RBS 410, and the networks 415. On the other hand, the interference around the first transceiver is detected by all second transceivers 420 and RBSs 410 and is sent to the RBS 410 linking with the first transceiver. As a result, the RBS 410 linking with the first transceiver is able to perform a signal correlation function according to the interference and determines to generate an anti-interference signal depending on the result of the signal correlation function. The interference around the first transceiver in the cellular communication system is eliminated after the anti-interference signal is sent to the first transceiver via the second transceiver 420 which has an optimal communication channel to the first transceiver. Wherein, the second transceiver 420 with the optimal communication channel to the first transceiver can be the one which firstly links with the first transceiver, can be any one in the same cellular communication area, or even can be the one in different cellular communication area. For example, when the first transceiver communicates in the middle cellular of the top row and has an optimal communication channel to the second transceiver 420 in the left cellular of the second row, the anti-interference signal will be transmitted to the second transceiver 420 in the left cellular of the second row via networks 415 and the RBS in the left cellular of the second row. Referring to FIG. 7, the difference between FIG. 7 and FIG. 6 is the number and the size of the cellular communication area. In FIG. 7, a plurality of RBSs with a plurality of second transceivers 420 are distributed and connected by a plurality of networks 415 in a cellular communication area. That is, each cellular communication area depicted in FIG. 6 can be detailed and extended like the cellular communication area depicted in FIG. 7 depending on the practice. As to the relations among the RBSs 410, the networks 415, and the second transceiver 420 shown in FIG. 7, they are the same as those described in FIG. 6, and hence, will not be repeated here.

Although specific embodiments have been illustrated and described, it will be obvious to those skilled in the art that various modifications may be made without departing from what is intended to be limited solely by the appended claims.

What is claimed is:

1. A system for actively cancelling interference signals, comprising:
   a first transceiver;
   a second transceiver, establishing a communication link and sending a communication signal to said first transceiver with a first antenna upon receiving a communication request from said first transceiver; and
   an active interference cancellation relay base station, detecting interference to said communication link, generating an electromagnetic anti-interference waveform by executing a signal correlation function, and wirelessly sending said electromagnetic anti-interference waveform towards said first transceiver via a second antenna wherein said second antenna is different from said first antenna;
   wherein said electromagnetic anti-interference waveform is configured to arrive at said first transceiver when said interference arrives at said first transceiver to neutralize said interference and cause said first transceiver to receive said communication signal without said interference.

2. The system according to claim 1, wherein said active interference cancellation relay base station obtains a result of a signal correlation function based on a feedback signal received from said second transceiver and an environmental signal; and said active interference cancellation relay base station generates said electromagnetic anti-interference waveform when said result is greater than or equal to a predetermined threshold.

3. The system according to claim 1, further comprising a third transceiver comprising said second antenna, wherein said third transceiver has an optimal communication channel for forwarding the electromagnetic anti-interference waveform towards the first transceiver; and said second antenna is a directional antenna.

4. The system according to claim 1, wherein said active interference cancellation relay base station generates said electromagnetic anti-interference waveform when a result from executing said signal correlation function is more than or equal to a predetermined threshold.

5. A method for providing an active interference cancellation to a pre-existing communication system, wherein said communication system comprises a first transceiver and a second transceiver, said method comprising:
   (a) providing an active interference cancellation relay station into said pre-existing communication system;
   (b) sending a communication request from said first transceiver for establishing a communication link between said first transceiver and said second transceiver;
   (c) sending a communication signal to said first transceiver from said second receiver using a first antenna;
   (d) detecting interference to said communication link by said active interference cancellation relay station;
   (e) generating an electromagnetic anti-interference waveform by said active interference cancellation relay station; and
   (f) transmitting wirelessly said electromagnetic anti-interference waveform towards said first transceiver via a second antenna different from said first antenna,
   wherein said electromagnetic anti-interference waveform is configured to arrive at said first transceiver when said interference arrives at said first transceiver to neutralize said interference and cause said first transceiver to receive said communication signal without said interference.

6. The method according to claim 5, wherein step (e) further comprises:
   obtaining a result of a signal correlation function based on a feedback signal received from said second transceiver and an environmental signal; and generating said electromagnetic anti-interference waveform when said result is greater than or equal to a predetermined threshold.

7. The method according to claim 5, wherein said pre-existing communication system further comprises a third transceiver with said second antenna and an optimal communication channel for forwarding said electromagnetic anti-interference waveform towards said first transceiver.

8. The method according to claim 7, wherein said second antenna is a directional antenna.

9. The method according to claim 5, wherein said active interference cancellation relay base station receives full channel state information from said first transceiver and said second transceiver.

10. The method according to claim 5, wherein said electromagnetic anti-interference waveform has a 180 degree phase difference from said interference.

11. The method according to claim 5, wherein step (b) further comprises:
    broadcasting a feedback signal from said second transceiver in response to said communication request.

12. The method according to claim 5, wherein step (d) further comprises: receiving a feedback signal from said second transceiver in response to a request by said active interference cancellation relay station.

13. The method according to claim 5, wherein step (e) further comprises:
    generating said electromagnetic anti-interference waveform by said active interference cancellation relay station via executing a signal correlation function based on said feedback signal and an environmental signal.

14. The method according to claim 7, wherein said active interference cancellation relay base station further transmits a location data to said third transceiver for transmitting said electromagnetic anti-interference waveform directly towards said first transceiver.

* * * * *